United States Patent [19]

Maccabee

[11] Patent Number: 5,505,476
[45] Date of Patent: Apr. 9, 1996

[54] TRIPLE MANUAL FOLDING STEPS

[75] Inventor: Malcom Maccabee, Yoncalla, Oreg.

[73] Assignee: Kwikee Products Co.,, Drain, Oreg.

[21] Appl. No.: 110,589

[22] Filed: Aug. 23, 1993

[51] Int. Cl.$^6$ .................................................. B60R 3/02
[52] U.S. Cl. ........................................ 280/166; 280/163
[58] Field of Search ................................... 280/166, 163; 296/62; 182/91

[56] References Cited

U.S. PATENT DOCUMENTS

| | | | |
|---|---|---|---|
| 1,189,595 | 7/1916 | McCarthy et al. | 280/166 |
| 2,436,961 | 3/1948 | Gabriel . | |
| 2,533,050 | 8/1949 | Runyen | 280/166 |
| 2,575,615 | 11/1951 | Crump . | |
| 2,852,271 | 9/1958 | McDonald . | |
| 2,921,643 | 1/1960 | Vanderveld . | |
| 3,330,577 | 7/1967 | Mills . | |
| 3,408,959 | 11/1968 | Cripe et al. . | |
| 3,645,557 | 2/1972 | Aldropp et al. . | |
| 3,807,757 | 4/1974 | Carpenter et al. . | |
| 3,834,490 | 9/1974 | Ford . | |
| 3,853,369 | 12/1974 | Holden . | |
| 3,876,230 | 4/1975 | Phillips . | |
| 4,106,790 | 8/1978 | Weiler | 280/166 |
| 4,108,457 | 8/1978 | Garrett | 280/166 |
| 4,623,160 | 11/1986 | Trudell | 280/166 |
| 4,720,116 | 1/1988 | Williams et al. . | |

FOREIGN PATENT DOCUMENTS

| | | | |
|---|---|---|---|
| 3932142A1 | 4/1990 | Germany . | |
| 399928 | 4/1966 | Switzerland . | |
| 3554 | of 1868 | United Kingdom | 280/166 |
| 719963 | 12/1954 | United Kingdom . | |

*Primary Examiner*—Margaret A. Focarino
*Assistant Examiner*—Min Yu
*Attorney, Agent, or Firm*—Christensen O'Connor Johnson & Kindess

[57] ABSTRACT

A retractable step apparatus for providing access to a recreational vehicle (6), or trailer includes a mounting frame (10), a top tread assembly (12) pivotally attached to the mounting frame, a center tread assembly (14) swingably coupled to the top tread assembly, and a bottom tread assembly (16) pivotally attached to the center tread assembly. The mounting frame includes right and left mounting brackets (18) and at least one crossmember (20, 22). The top tread assembly includes right and left top brackets (26) and a top step (28) attached between the right and left top brackets. The center tread assembly includes right and left center brackets (36) and a center step (38) attached between the right and left center brackets. The bottom tread assembly includes right and left bottom brackets (46) and a bottom step (48) attached between the right and left bottom brackets. The step apparatus is arranged and configured such that retraction of the assembly is carried out by pivoting the bottom tread assembly 180 degrees into a position above the center tread assembly. The center tread assembly, with the bottom tread assembly upon it, is swung beneath and into the top tread assembly. The top tread assembly, having the center and bottom tread assemblies nested within it, is pivoted from its lower rearward corners into the mounting frame and latched into position such that the entire retractable step assembly is beneath the doorway (17) of the recreational vehicle when not in use. Deployment of the retractable step apparatus is carried out by reversing the above procedure.

21 Claims, 4 Drawing Sheets

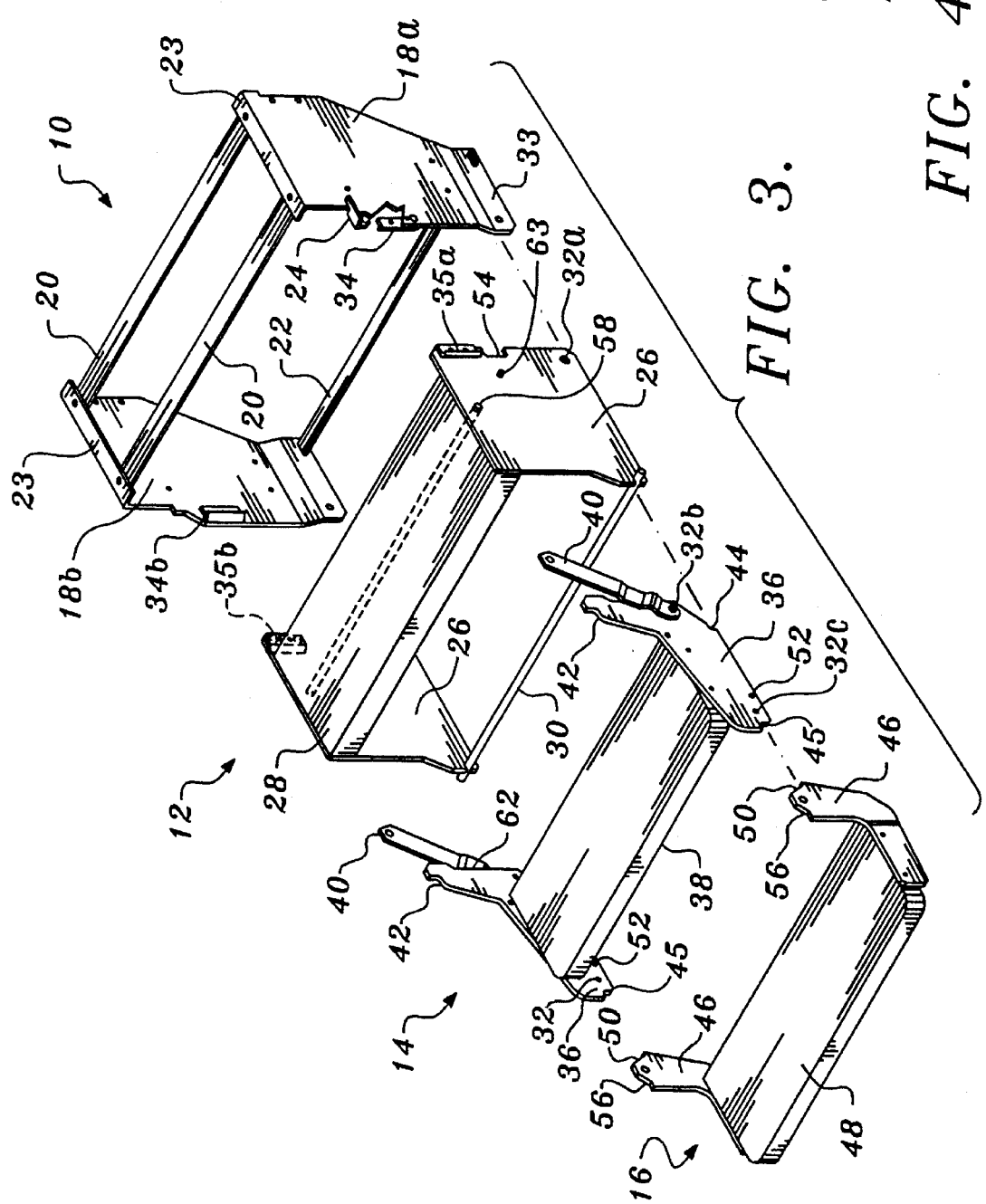

TRIPLE MANUAL FOLDING STEPS

FIELD OF THE INVENTION

This invention relates generally to folding steps, and more particularly, to folding steps for vehicles, especially motor homes, recreational vehicles, automotive trailer vehicles, campers, and the like.

BACKGROUND OF THE INVENTION

The doorway threshold of recreational vehicles, trailers, and the like is typically high above the ground. Access to these vehicles can be difficult and even unsafe, especially for older persons who often use such vehicles. A series of permanent steps attached beneath the doorway to permit easy access would be impractical, since they would decrease the effective clearance of the vehicle and extend the width or length of the vehicle (possibly beyond legal limits).

The desirability of having steps for recreational vehicles that may be folded out of the way when not in use has long been recognized. Such steps should fold readily, store compactly, and permit easy, safe access to the vehicle or trailer. The steps should not increase the overall width of the vehicle when not in use, since the steps may already extend to the maximum width allowed by regulation. The retracted width of the steps should be such that, when not in use, the rear of the steps do not interfere with the mainframe channels of the vehicle. The depth of the steps presents another safety/ease-of-access consideration: ideally each step should be deep enough to permit the entire foot of the user to have tread access, not just the heel or toe, when both ascending and descending. This is especially important when descending, for example, to keep the user from pitching forward.

Many designs have been developed in attempts to address some of the abovedescribed considerations. For example, U.S. Pat. No. 3,876,230 to Phillips discloses foldable camper steps that pivot one on the other until they reach a fully retracted position. Each of the step members is formed from an L-shaped member. Several problems exist with the application of the Phillips step assembly to a recreational vehicle or trailer. The vehicle door is typically on the side. As such, very little or no increase in width beyond the door can be allowed by the steps when not in use. The Phillips steps, even when fully retracted, extend at least the width of one step beyond the door. Another problem is in the shallowness of the depth of the step treads. A user may not be able to fit his or her entire foot on the tread. Deepening the tread would only exacerbate the overall increased vehicle width problem.

U.S. Pat. No. 4,106,790 to Weiler discloses a retractable vehicle step that swings into a retracted position. This step could be mounted on the side of a recreational vehicle and stowed beneath the door under the side of the vehicle when not in use. However, since only one step is disclosed, safe and convenient access may be somewhat less than desirable. If the mainframe height of the step is kept within a reasonable range for ground clearance purposes, the distance from the step to the ground may be excessive. If the step did project lower, the distance from the door threshold to the step may be excessive.

The limitations of the above-described steps of the prior art are typical of current designs. The present invention was developed to effectively address the problem of convenient, safe access to recreational vehicles, trailers, and the like while fitting within the constraints imposed by space limitations such as ground clearance, restricted vehicle width, and small mounting areas.

SUMMARY OF THE INVENTION

A retractable step apparatus for safe and convenient access to and egress from recreational vehicles, trailers, and the like is disclosed. The apparatus includes a mounting frame, a top tread assembly pivotally attached to the mounting frame, a center tread assembly swingably coupled to the top tread assembly, and a bottom tread assembly pivotally attached to the center tread assembly.

In a preferred embodiment of the invention, the bottom tread assembly includes a bottom step and a first bottom bracket. The first bottom bracket has an upper end attached to the center tread assembly and a lower end attached to the bottom step. The first bottom bracket is pivotally attached to the center tread assembly such that it is pivoted at least partially above the center tread assembly for purposes of step retraction. In the preferred embodiment, the bottom tread assembly includes a second bottom bracket, the bottom step being attached between the first and second bottom brackets. The upper portions of the bottom brackets also have means to restrict excessive downward pivotal movement of the bottom step.

The center tread assembly includes a center step and a first center bracket. The first center bracket has a forward portion and a rearward portion, the forward portion being pivotally attached to the bottom tread assembly and the rearward portion being swingably attached to the top tread assembly. The center step is also attached to the first center bracket. Preferably, the center tread assembly also includes a second center bracket, the center step being attached between the first and second center brackets. The center brackets include forward, rearward, upper, and lower portions, the center step being attached between the lower portions of the first and second (or right and left) center brackets.

The center tread assembly of the preferred embodiment also includes a first swing arm pivotally attached to the rearward portion of the first center bracket and pivotally attached to the top tread assembly. The first swing arm permits the center tread assembly to swing within the top tread assembly for purposes of step retraction. The first center bracket also includes a step retention means for restricting the movement of the center tread assembly relative to the top tread assembly when the center tread assembly is in an extended position and when in a retracted position.

As another aspect of the preferred embodiment of the invention, the top tread assembly includes a top step and a first top bracket. The first top bracket has top, bottom, forward, and rearward portions. The top step is attached to the top portion of the first top bracket. The first top bracket is pivotally attached to the mounting frame at the bottom, rearward portions for purposes of retraction such that the top tread assembly nests substantially within the mounting frame when pivotally retracted. Preferably, the top tread assembly includes a second top bracket, the top step being attached between the first and second top brackets. The top brackets include upper portions between which the top step is attached.

The preferred embodiment also includes means to stop and center the top tread assembly as it is pivoted from within the mounting frame to an extended position. The stop means comprise at least one set of stops including a mounting frame stop and a top assembly stop. The mounting frame stop is secured to at least one of the mounting brackets and the top assembly stop is secured to at least one of the top brackets. Each stop has a portion forming an acute angle with its respective bracket. The angled portions of the stops are arranged and configured to engage each other, as the top tread assembly is pivoted from within the mounting frame, to stop the pivotal movement of the top tread assembly at a predefined position and also minimize sideways movement of the top tread assembly relative to the mounting frame.

Preferably, the mounting frame includes a first mounting bracket, a second mounting bracket, and at least one cross-member attached between the first mounting bracket and the second mounting bracket. The mounting frame also includes means to restrict the pivotal movement of the top tread assembly as it is nested within the mounting frame. The mounting frame also preferably includes attachment means to secure the mounting frame beneath a doorway.

In another aspect of the preferred embodiment of the invention, latch means are used to retain the retracted step assembly within the mounting frame. Means to stop and center the top tread assembly as it is pivoted from within the mounting frame are also included.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is an isometric exploded view of the step apparatus showing all the elements of construction;

FIG. 4 is an enlarged, fragmentary cross-sectional view illustrating the stopping and centering mechanism employed between the mounting frame and the top tread assembly as taken along lines 4—4 of FIG. 2;

DETAILED DESCRIPTION OF THE PREFERRED EMBODIMENT

Figure 1:
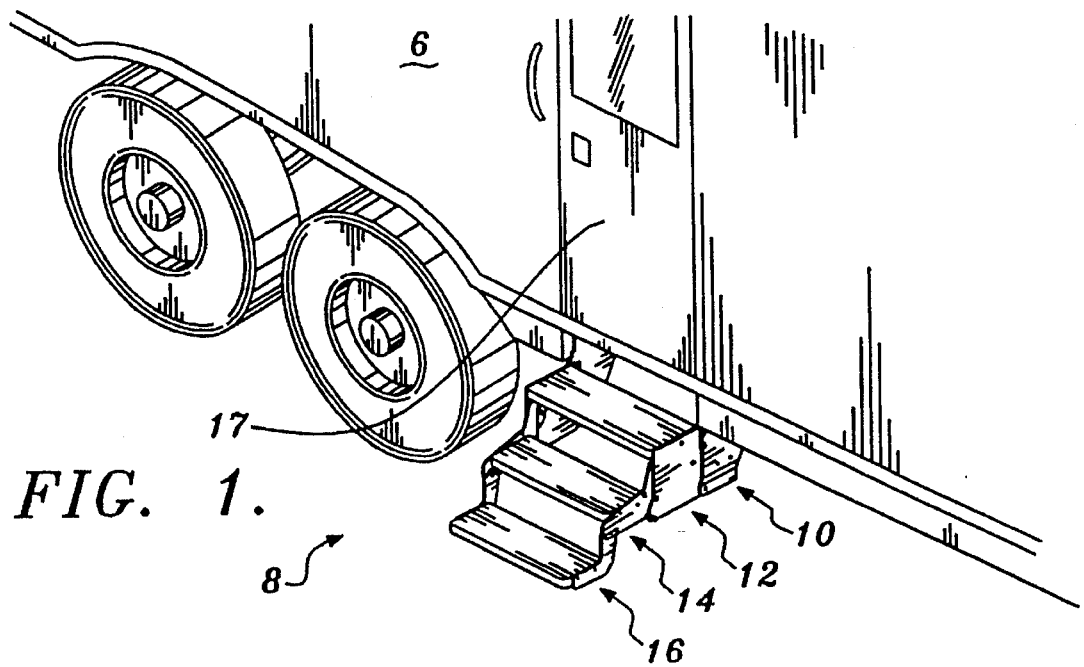
FIG. 1 is a perspective view of the steps of the present invention in an extended position attached beneath the doorway of a recreational vehicle.

A preferred embodiment of the present invention, as illustrated in FIG. 1, provides a retractable step assembly 8 that may be mounted, for example, on trailers or other recreational vehicles 6 to be manually folded down as needed. Step assembly 8 includes a stationary mounting frame 10, a top tread assembly 12, a center tread assembly 14, and a bottom tread assembly 16. Mounting frame 10 is preferably bolted securely in place beneath the threshold of a door 17. The forward side of mounting frame 10 (the outwardly facing side and to the left hand direction shown in the Figures) is just behind the outer face of vehicle 6, such that mounting frame 10 adds no width to vehicle 6. Nor does entire step assembly 8 add any width to vehicle 6 when in a retracted position, as will be explained more fully below in connection with FIG. 8. Top tread assembly 12 is pivotally attached to the lower, forward portion of mounting frame 10 and extends outwardly from mounting frame 10 when in use. Center tread assembly 14 is swingably attached to top tread assembly 12 to extend outwardly from top tread assembly 12 when in use. Finally, bottom tread assembly 16 is pivotally attached to center tread assembly 14 and extends downwardly and outwardly to provide the final step before the ground. Thus, three steps are provided that can be extended to descend from or ascend to door 17 of vehicle 6, as described in more detail below, to provide easy and safe egress and access.

Figure 2:
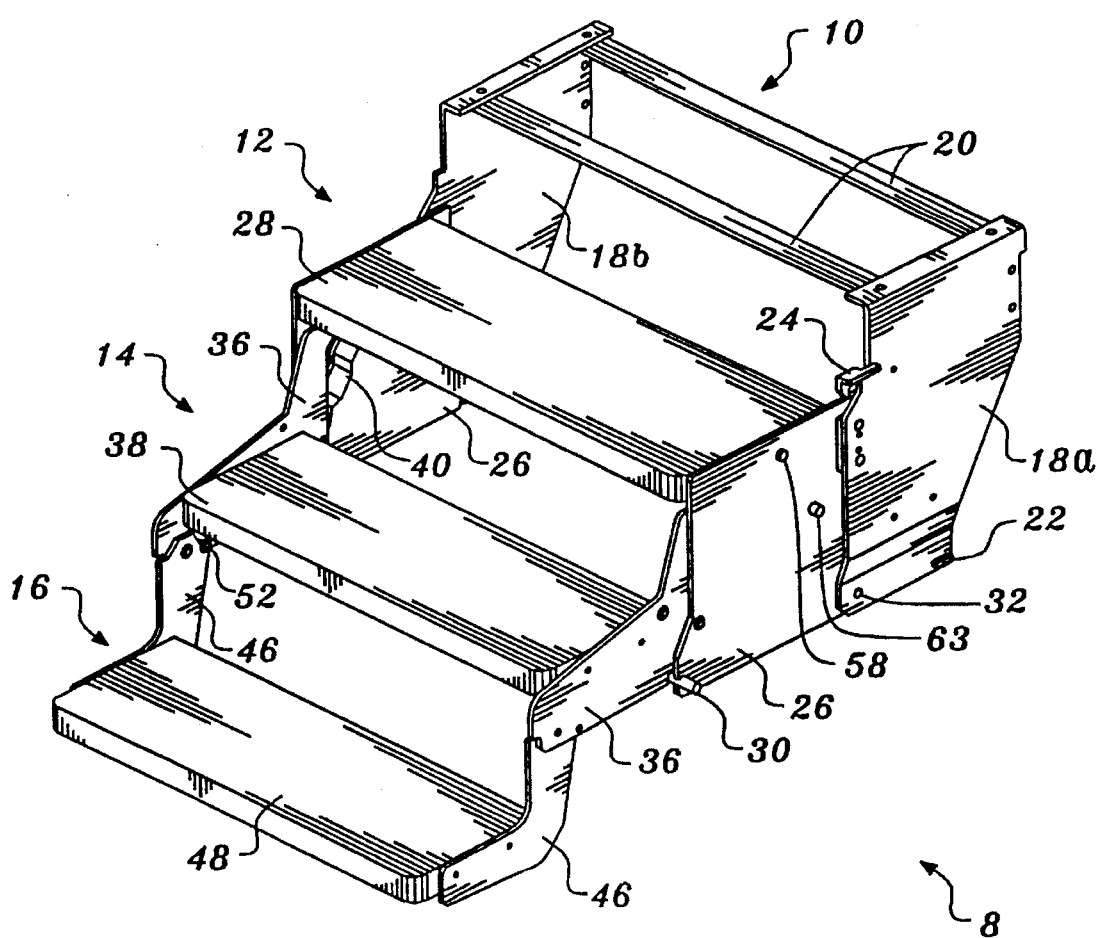
FIG. 2 is an isometric view of the step apparatus of the present invention shown in more detail detached from the recreational vehicle in an extended position.

The components of step assembly 8 are illustrated in more detail in FIGS. 2 and 3. Mounting frame 10 includes a pair of formed, spaced-apart, vertical mounting brackets 18 interconnected at their upper ends by a pair of elongate cross straps 20, and interconnected at their bottom right-hand or inward corners by a lower strap 22. Mounting brackets 18 are generally rectangular in shape except for angled cuts along the lower, rearward (inward) portions and small notch sections removed from the upper forward (outward) portions. The upper portions include 90-degree bends entirely across them to provide horizontal flanges 23 to which are attached cross straps 20. Preferably cross straps 20 are welded or otherwise fixedly attached to mounting brackets 18. Left mounting bracket 18b is the mirror image of fight mounting bracket 18a, top cross straps 20 and lower strap 22 connecting the two. Lower strap 22 extends horizontally between lower rearward portions of mounting brackets 18. Cross straps 20, as well as lower strap 22, preferably are constructed of rigid, narrow metal strips long enough to provide the desired width of step assembly 8 and of sufficient structural integrity to form a rigid mounting frame.

A latch 24 is pivotally mounted on the forward portion of fight mounting bracket 18a. The construction and operation of latch 24 will be described in more detail below in connection with FIG. 9.

First stop angles 34 are also attached to the forward portions of mounting brackets 18. First stop angles 34 have rearward flange portions 34a attached to the inside surfaces of the mounting brackets 18 and forward hook portions 34b that angle rearwardly away from the vertical sides of mounting brackets 18 at an angle 34c of about 30 degrees. The function of first stop angles 34 will be described in more detail below in connection with FIG. 4.

Top tread assembly 10 includes a pair of generally rectangularly-shaped side brackets 26 interconnected at their upper ends by a top step 28 and interconnected at their bottom front corners by a cross rod 30. Top side brackets 26 are mirror images of each other disposed in spaced-apart, vertical planes perpendicularly to the longitudinal axis of top step 28. Top step 28 is disposed in a horizontal plane, preferably a few inches beneath the top of mounting frame 10 when step assembly 8 is in an extended configuration. Top step 28 is generally rectangular in shape with downwardly extending forward and rearward flanges integrally formed with the top surface of the top step to add structural strength. Top tread assembly 12 is pivotally attached to mounting frame 10 by pins 32 extending inwardly from the lower, forward corners of the slightly offset bottom flanges 33 formed in the mounting brackets 18 to extend through close filling openings formed in the lower rearward corners of the side brackets 26.

Top tread assembly 12 is retained in its extended position relative to mounting frame 10 by a pair of second stop angles 35 extending outwardly (forwardly) from the upper rearward corners of top side brackets 26 to engage with corresponding first stop angles 34 secured to mounting brackets 18, as described above. Second stop angles 35 have rearward flange portions 35a attached to the rearward edge portions of side brackets 26 and forward angled portions 35b angled away from the flange portions 35a at an angle 35c of about 60 degrees (see FIG. 4). The right second stop angle 35 has its angled portion 35b in a plane parallel to the hook portion 34b of the fight, first stop angle 34 when step assembly 8 is in an extended position. Likewise, left second stop angle 35 has its angled portion 35b in a plane parallel to the hook portion 34b of left, first stop angle when stop assembly 8 is in an extended position. Stop angles 34 and 35 cooperatively center the top tread assembly 12 relative to the mounting frame assembly 10 when they come into abutting contact with each other to not only limit the pivotal movement of top tread assembly 12 relative to mounting frame 10, but also minimize any side-to-side movement between the top tread assembly and the mounting frame. The rearward edge 34d of flange portion 34a is beveled at an angle of about 45 degrees to facilitate the smooth engagement of the forward angled portion 35b of stop angle 35 with the corresponding hook portion 34b of first stop angle 34.

Referring again to FIGS. 2 and 3, a swing-arm rod 58 spans between top side brackets 26 generally centrally beneath top step 28. Ideally, swing-arm rod 58 has a circular cross section and a longitudinal axis parallel to the longitudinal axis of top step 28. Swing-arm rod 58 functions as part of the connection to center tread assembly 14 as described below.

Center tread assembly 14 includes a pair of generally triangular center side brackets 36, a center step 38 extending between side brackets 36, and swing arms 40 connecting center side brackets 36 to swing-arm rod 58 beneath top step 28. The ends of the swing rod 58 engage through openings formed in the upper, central portions of side brackets 26 of top tread assembly 12. Center step 38 lies in a plane parallel to top step 28 when step assembly 8 is in an extended position. Center step 38 is connected to central portions of center side brackets 36 parallel to the bottom edges of center brackets 36. Right and left swing arms 40 are constructed of lengths of metal in generally long, rectangular shapes with rounded ends and offset bends 62. The upper ends of swing arms 40 are welded or otherwise fixedly attached to swing-arm rod 58 so that both arms 40 swing in unison. The lower ends of swing arms 40 are pivotally connected to the rearward, central portion of side brackets 36. Thus, by the connections of swing arms 40, center tread assembly 14 is allowed to swing and pivot relative to top tread assembly 12. Stops in the form of pins 63 extend a short distance inwardly from each side bracket 26 at a location along the inward edge portion of the bracket.

Offset bends 62 minimize side-to-side movement of center tread assembly 14 relative to top tread assembly 12 as well as contact against the stop pins 63 extending inwardly from side brackets 26 to insure rearward positioning of the center tread assembly when in retracted position, as discussed below. The upper portions of swing arms 40 are disposed parallel to and directly adjacent side brackets 26 of top tread assembly 12. Offset bends 62 move the lower portions of swing arms 40 parallel to and directly adjacent side brackets 36 of center tread assembly 14. Thus, the lower portions of swing arms 40 abut side brackets 36 while the upper portions abut side brackets 26 to maintain proper spacing, centering, and thus, stability to center tread assembly 14.

The pivotal and swinging movement of center tread assembly 14 is restrained by vertical shoulders 42, inward notches 44, outward notches 45, and the bottom, forward edges of side brackets 36. Vertical shoulders 42 are formed in the forward portions of upper corners of side brackets 36. When center tread assembly 14 is in the extended position, vertical shoulders 42 of the side brackets 36 abut against downwardly turned edges of the forward flange of top step 28. The lower rearward corners of side brackets 36 are formed to define inward notches 44. When center tread assembly 14 is in an extended position, inward notches 44 engage cross rod 30 of top tread assembly 12. The combination of inward notches 44 and vertical shoulders 42 prevents downward rotation of center tread assembly 14 when in an extended position. Cross rod 30 seats within outward notches 45 when center tread assembly 14 is in a retracted position, as explained below in connection with FIG. 7.

Bottom tread assembly 16 is composed of generally L-shaped bottom side brackets 46 and a bottom step 48. Bottom side brackets 46 have lower horizontal portions and upwardly extending vertical portions (referring to the orientation of bottom side brackets 46 when extended). The bottom step 48 spans between the lower horizontal leg portions of bottom side brackets 46 parallel to center step 38. The upper ends of side brackets 46 are pivotally attached to the lower front portions of center brackets 36 just behind forward notches 45. The pivotal connection is formed with pins 32c fitting between openings in the top of side brackets 46 between rearward notches 50 and outward notches 56. Pins 32c connect to openings within side brackets 36 of center tread assembly 14 between notches 45 and 52. When bottom tread assembly 16 is in an extended position, rearward notches 50 formed in the upper rearward corners of side brackets 46 engage studs 52 extending inwardly from the lower front portions of center brackets 36 just rearward of the pivotal connections of pins 32c of bottom side brackets 46. Studs 52 thereby prevent excessive downward pivotal movement of bottom tread assembly 16 when in an extended position. As discussed above, outward notches 56 are formed within the forward portions of upper ends of bottom brackets 46 at locations forward of the pivotal connection of pins 32c of bottom side brackets 46 to center tread assembly 14. Notches 56 prevent excessive pivotal movement of bottom tread assembly when retracted, as discussed below in connection with FIG. 6.

By the foregoing construction, step assembly 8 of the present invention may be manually and conveniently extended to provide access to recreational vehicle 6, and thereafter retracted to a stowage position substantially within mounting frame 10. FIGS. 5 through 8 illustrate the basic retraction of step assembly 8 into mounting frame 10. Reversal of the process shown results in step extension.

Figure 5:
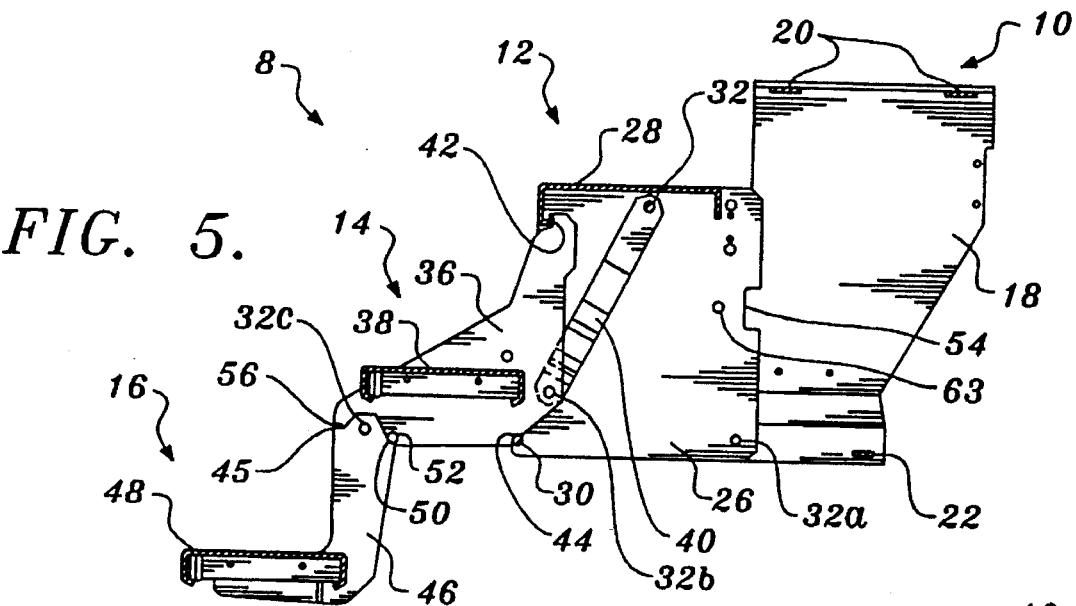
FIG. 5 is a sectional view of the step apparatus taken along a median longitudinal sectional plane showing the configuration and interrelations of the brackets and steps.
Figure 6:
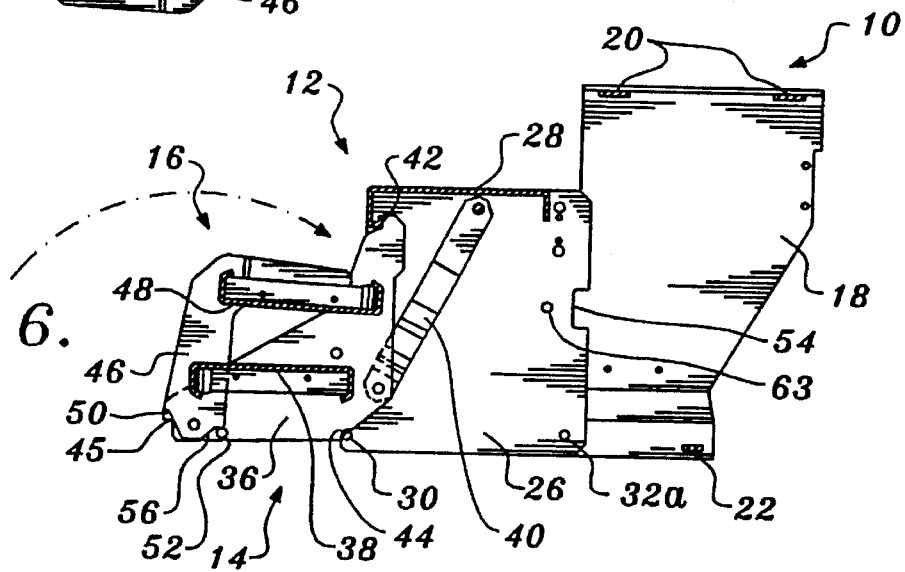
FIG. 6 is a sectional view similar to that shown in FIG. 5 showing the nesting of the bottom tread assembly over the center tread assembly.

Referring to FIGS. 5 and 6, step assembly 8 is retracted by first pivoting bottom tread assembly 16 approximately 180 degrees upwardly (clockwise in FIG. 6) to a position where bottom step 48 is upside-down above center step 38, as indicated by the arrow in FIG. 6. In this position, outward notches 56 beating against studs 52 restrict further clockwise rotation of bottom tread assembly 16.

Figure 7:
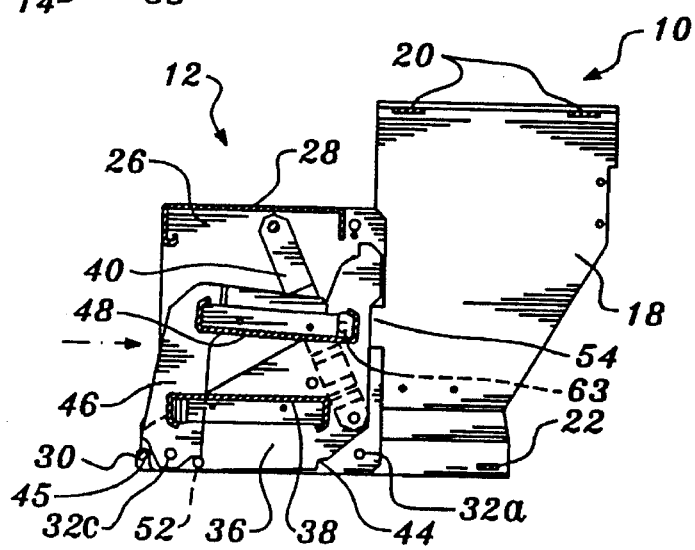
FIG. 7 is a sectional view of the step apparatus showing the arrangement of the apparatus after the center tread assembly, with the bottom tread assembly, is swung within the top tread assembly.

Referring to FIGS. 6 and 7, center tread assembly 14, with bottom tread assembly 16 positioned above it, is raised slightly by pivoting (clockwise as shown in FIG. 6) about the lower ends of swing arms 40 to upwardly unseat notches 44 from cross rod 30 and cause the rearward/inward notches 44 to clear cross rod 30, whereupon center tread assembly 14, along with swing arms 40, are swung in a rearward (inward) direction into the envelope of top tread assembly 12 until the swing arms abut against stop pins 63 whereupon the forward notches 45, formed in the lower front corner of center side brackets 36, engage with cross rod 30. As center tread assembly 14 is being swung within top tread assembly 12, the lower edge of center side brackets 36 may ride along cross rod 30. In this position, both bottom tread assembly 16 and center tread assembly 14 are nested substantially within top tread assembly 12.

Figure 8:
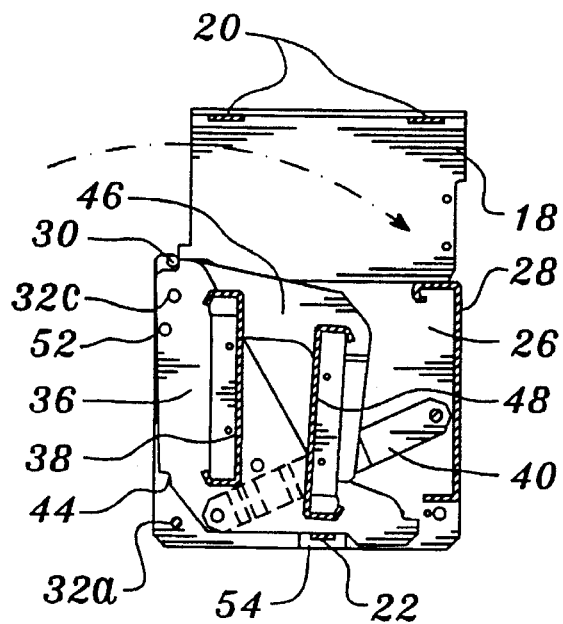
FIG. 8 illustrates the arrangement of the apparatus with all tread assemblies being nested within the mounting frame.

Lastly, referring to FIGS. 7 and 8, top tread assembly 12 is rotated 90 degrees clockwise (along with bottom tread assembly 16 and center tread assembly 14) to nest within the envelope defined by mounting frame 10, as shown by the arrow in FIG. 8. The retracted steps are stopped in their clockwise rotation by lower strap 22 coming into contact with top bracket recesses 54 formed in the rearward edges of top side brackets 26 and also coming into contact with the rearward edges of center side brackets 36.

Figure 9:
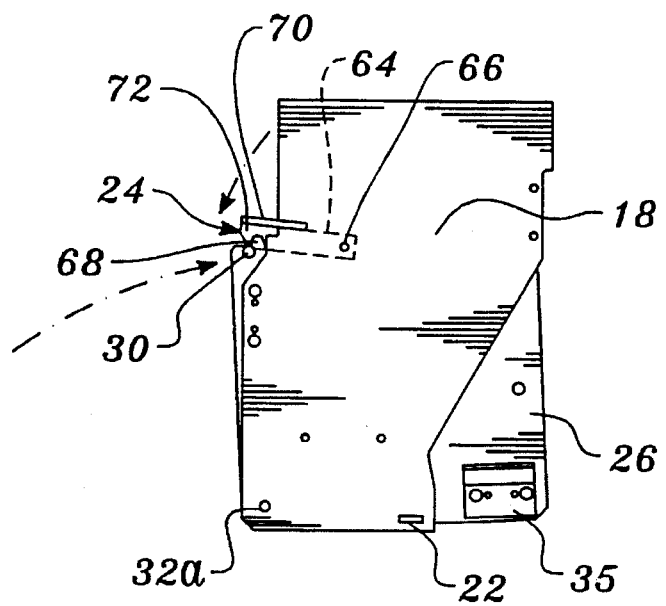
FIG. 9 illustrates the configuration and operation of the latch to secure all tread assemblies in the nesting configuration within the mounting frame.

Although the described retracted arrangement is stable for travel (since the retracted tread assemblies 12, 14, and 16 are pivoted to an over center position about pins 32), extra security is provided by latch 24 (see FIG. 9). Latch 24 includes a rectangular, vertical portion 64 pivotally attached by pin 66 at its rearward end to fight-side mounting bracket 18a. A hook 68 is formed within the forward end of vertical portion 64 extending forward of the forward edge of mounting bracket 18a. The top of latch 24 includes a flange 70 formed by a 90-degree bend with vertical portion 64 to provide a convenient tab against which to place one's finger to pivot latch 24 upwardly out of engagement with cross rod 30. Flange 70 also abuts against a notch 72 formed in the forward edge of side bracket 18a to stop the downward rotational movement of latch 24 so that it is automatically aligned with cross rod 30 and engages cross rod 30 when top tread assembly 12 is retractably pivoted within mounting frame 10, as shown in FIG. 9. Latch 24 engages with cross rod 30 to lock top tread assembly 12 in the retracted position with center tread assembly 14 and bottom tread assembly 16 nested within top tread assembly 12, thus assuring step assembly 8 remains retracted during travel of the vehicle.

The step assembly 8 can conveniently be manually extended by simply reversing the above process.

While a preferred embodiment of the invention has been illustrated and described, it will be appreciated that various changes can be made therein without departing from the spirit and scope of the invention.

The embodiments of the invention in which an exclusive property or privilege is claimed are defined as follows:

1. A retractable step apparatus comprising:
   (a) a mounting frame;
   (b) a top tread assembly pivotally attached to the mounting frame, said top tread assembly including a top tread, the top tread assembly being retractable to substantially within and extendible from the mounting frame;
   (c) a center tread assembly swingably coupled to the top tread assembly about at least two pivot axes, the center tread assembly being attached to the top tread assembly with at least one link, the at least one link being pivotally attached to the top tread assembly at one end portion of the link and pivotally attached to the center tread assembly at the opposite end portion of the link so as to swing the center tread assembly within the top tread assembly under the top tread with generally rearward translational movement, the center tread assembly being retractable to substantially within and extendible from the top tread assembly; and
   (d) a bottom tread assembly including a bottom tread and a bracket fixedly attached to said bottom tread with a top end portion pivotally attached to the center tread assembly such that the bottom tread assembly can pivot to substantially above the center tread assembly and be retracted to a position substantially within the top tread assembly with the center tread assembly, the top, center, and bottom tread assemblies all being retractable to substantially within the mounting frame.

2. The retractable step apparatus of claim 1, wherein the mounting frame comprises laterally spaced-apart first and second mounting brackets, and at least one reinforcing crossmember attached between the first and second mounting brackets, the top tread assembly being pivotally secured between the first and second mounting brackets and nesting substantially therebetween when retracted.

3. The retractable step apparatus of claim 2, wherein the top tread assembly is nestable within the mounting frame and wherein the mounting frame further comprises means to restrict the pivotal movement of the top tread assembly as the top tread assembly is retraced into nested position within the mounting frame.

4. The retractable step apparatus of claim 1, further comprising a latch attached to the mounting frame, the latch being engagable with the top tread assembly to retain the retracted step assemblies within the mounting frame.

5. The retractable step apparatus of claim 1, further comprising means to stop and center the top tread assembly as the top tread assembly is pivotally extended from within the mounting frame.

6. A retractable step apparatus comprising:
   (a) a mounting frame:
   (b) a top tread assembly pivotally attached to the mounting frame, the top tread assembly being retractable to substantially within and extendible from the mounting frame;
   (c) a center read assembly swingably coupled to the top tread assembly about at least two pivot axes, the center tread assembly being attached to the top tread assembly with at least one link, a link being pivotally attached to the top tread assembly at one end and pivotally attached to the center tread assembly at the opposite end so as to swing within the top tread assembly with generally rearward translational movement, the center tread assembly being retractable to substantially within and extendible from the top tread assembly; and
   (d) a bottom tread assembly including a bracket having a top end pivotally attached to the center tread assembly such that the bottom tread assembly can pivot to substantially above the center tread assembly and be retracted substantially within the top tread assembly with the center tread assembly, the top, center, and bottom tread assemblies all being retractable to substantially within the mounting frame, wherein the bottom tread assembly comprises a bottom step and at least one bottom bracket having an upper end attached to the center tread assembly and a lower end fixedly attached to the bottom step, a bottom bracket being pivotally attached to the center tread assembly such that the bottom tread assembly is pivoted at least partially above the center tread assembly for purposes of step retraction.

7. A retractable step apparatus comprising:

(a) a mounting frame;

(b) a top tread assembly pivotally attached to the mounting frame, the top tread assembly being retractable to substantially within and extendible from the mounting frame:

(c) a center tread assembly swingably coupled to the top tread assembly about at least two pivot axes, the center tread assembly being attached to the top tread assembly with at least one link, a link being pivotally attached to the top tread assembly at one end and pivotally attached to the center tread assembly at the opposite end so as to swing within the top tread assembly with generally rearward translational movement, the center tread assembly being retractable to substantially within and extendible from the top tread assembly; and (d) a bottom tread assembly including a bracket having a top end pivotally attached to the center tread assembly such that the bottom tread assembly can pivot to substantially above the center tread assembly and be retracted substantially within the top tread assembly with the center tread assembly, the top, center, and bottom tread assemblies all being retractable to substantially within the mounting frame, wherein the center tread assembly comprises a center step and at least one center bracket having a forward portion and a rearward portion, the forward portion being pivotally attached to the bottom tread assembly and the rearward portion being swingably attached about at least two pivot axes to the top tread assembly, the center step also being fixedly attached to the center bracket, the bottom of the center tread assembly being slidably engaged with a portion of the top tread assembly.

8. The retractable step apparatus of claim 7, wherein the center tread assembly further comprises a first swing arm pivotally attached to the rearward portion of the center bracket and pivotally attached to the top tread assembly, the first swing arm permitting the center tread assembly to swing within the top tread assembly for purposes of step retraction.

9. The retractable step apparatus of claim 8, wherein the first center bracket further comprises step retention means for restricting movement of the center tread assembly relative to the top tread assembly when the center tread assembly is in an extended position and when in a retracted position.

10. A retractable step apparatus comprising:

(a) a repenting frame;

(b) a top tread assembly pivotally attached to the mounting frame, the top tread assembly being retractable to substantially within and extendible from the mounting frame, wherein the top tread assembly comprises a top step and at least one top bracket having top, bottom, forward, and rearward portions, the top step being fixedly attached to the top portion of the top bracket, the top bracket being pivotally attached to the mounting frame at the bottom and rearward portions of the top bracket for purposes of retraction such that the top tread assembly nests substantially within the mounting frame when retracted;

(c) a center tread assembly swingably coupled to the top tread assembly about at least two pivot axes, the center tread assembly being attached to the top tread assembly with at least one link, a link being pivotally attached to the top tread assembly at one end and pivotally attached to the center tread assembly at the opposite end so as to swing within the top tread assembly with generally rearward translational movement, the center tread assembly being retractable to substantially within and extendible from the top tread assembly; and (d) a bottom tread assembly including a bracket having a top end pivotally attached to the center tread assembly such that the bottom tread assembly can pivot to substantially above the center tread assembly and be retracted substantially within the top tread assembly with the center tread assembly, the top, center, and bottom tread assemblies all being retractable to substantially within the mounting frame.

11. A retractable step apparatus comprising:

(a) a mounting frame;

(b) a top tread assembly pivotally attached to the mounting frame, the top tread assembly being retractable to substantially within and extendible from the mounting frame;

(c) a center tread assembly swingably coupled to the top tread assembly about least two pivot axes, the center tread assembly being attached to the top tread assembly with at least one link, a link being pivotally attached to the top tread assembly at one end and pivotally attached to the center tread assembly at the opposite end so as to swing within the top tread assembly with generally rearward, translational movement, the center tread assembly being retractable to substantially within and extendible from the top tread assembly: and (d) a bottom tread assembly including a bracket having a top end pivotally attached to the center tread assembly such that the bottom tread assembly can pivot to substantially above the center tread assembly and be retracted substantially within the top tread assembly with the center tread assembly, the top, center, and bottom tread assemblies all being retractable to substantially within the mounting frame, wherein the mounting frame comprises first and second laterally spaced-apart mounting brackets and at least one crossmember, the tread assemblies nesting between the first and second mounting brackets when in a retracted position, the top tread assembly comprises first and second spaced-apart top brackets and a top step fixedly attached between the first and second top brackets, the center tread assembly comprises first and second center brackets and a center step fixedly attached between the first and second center brackets, and the bottom tread assembly comprises first and second bottom brackets and a bottom step fixedly attached between the first and second bottom brackets.

12. The retractable step apparatus of claim 11, wherein the mounting frame includes attachment means to secure the mounting frame beneath a doorway, lower rearward portions of the first and second top brackets being pivotally attached to lower forward portions of the mounting brackets such that the top tread assembly pivots about an axis defined by the attachment of the top tread assembly to the first and second mounting brackets, the top tread assembly nesting within the mounting frame when in a retracted position.

13. The apparatus of claim 11, further comprising means to stop and center the top tread assembly as the top tread assembly is pivoted from within the mounting frame to an extended position.

14. The apparatus of claim 13, further including a latch attached to the mounting bracket and engagable with the top tread assembly when nested within the mounting frame to restrain the retracted assemblies substantially within the mounting frame.

15. The retractable step apparatus of claim 11, wherein the mounting frame includes attachment means to secure the mounting frame beneath a doorway, lower rearward portions of the first and second top brackets being pivotally attached to lower forward portions of the mounting brackets such that the top tread assembly pivots about an axis defined by the attachment of the top tread assembly to the first and second mounting brackets, the top tread assembly nesting within the mounting frame when in a retracted position, and wherein the top brackets include upper portions between which the top step is fixedly attached; and wherein the center brackets include forward, rearward, upper, and lower portions, the center step being fixedly attached between the lower portions of the first and second center brackets; and wherein the center tread assembly further includes at least one swing arm coupled between the center tread assembly and the top tread assembly, the swing arm being pivotally attached to the top tread assembly at one end and pivotally attached to the center tread assembly at the opposite end such that the swing arm swingably couples the center tread assembly to the top tread assembly making the center tread assembly rearwardly and forwardly movable between an extended position for use as a step and a retracted position for storage substantially within the top tread assembly beneath the top step.

16. The apparatus of claim 15, wherein the center brackets include restriction means for restricting pivotal and swinging motion of the center step about the swing arm pivotal attachments, the restriction means restricting the center step from excessive downward pivotal and swinging movement when in an extended position and restricting pivotal and swinging movement out of a nested position substantially within the top tread assembly when in a retracted position.

17. The apparatus of claim 16, wherein the bottom brackets have upper portions and lower portions, the upper portions of the bottom brackets being pivotally attached to the center brackets such that the bottom tread assembly is pivoted into a position over the center step when retracted, the upper portions of the bottom brackets also having means to restrict excessive downward pivotal movement of the bottom step.

18. The apparatus of claim 11, further comprising means to stop and center the top tread assembly as the top tread assembly is pivoted from within the mounting frame to an extended position wherein the top tread assembly is pivotable within the mounting frame and wherein the stop means comprise at least one set of stops including a mounting frame stop and a top assembly stop, the mounting frame stop being secured to at least one of the mounting brackets and the top assembly stop being secured to at least one of the top brackets; and wherein each stop has a portion forming an acute angle with the respective bracket, the angled portions of the stops being arranged and configured to engage each other as the top tread assembly is pivoted from within the mounting frame to stop the pivotal movement of the top tread assembly at a predefined position.

19. A retractable step apparatus for providing access to and egress from a vehicle, the apparatus comprising:

(a) a mounting frame having two frame side brackets adapted for fixed attachment to the vehicle, the frame side brackets having bottom, forward corners;

(b) a top tread assembly pivotally attached to the mounting frame at the bottom, forward corners of the frame side brackets, the top tread assembly including side brackets and a step fixedly attached to the side brackets;

(c) a center tread assembly swingably coupled to the top tread assembly, the center tread assembly having side brackets with outward and inward portions and a center step fixedly attached to the center assembly side brackets, wherein the center assembly side brackets fit within the top assembly side brackets when the center tread assembly is swung within the top tread assembly, the center tread assembly being movable rearwardly and forwardly between an extended position and a retracted position between the top assembly side brackets; and (d) a bottom tread assembly pivotally attached to the center tread assembly, the bottom tread assembly having side brackets with top and bottom portions and a bottom step fixedly attached to the bottom assembly side brackets, the pivotal attachment of the bottom tread assembly to the center tread assembly being made by pivotal attachment of top portions of the bottom assembly side brackets to outward portions of the center assembly side brackets such that the bottom tread assembly is movable between an extended position forward of and below the center step and a retracted position above the center step.

20. A retractable step apparatus comprising:

(a) a mounting frame including first and second spaced-apart mounting brackets;

(b) a top tread assembly pivotally attached to the mounting frame, the top tread assembly including first and second spaced-apart top brackets and a top step attached between the first and second top brackets, wherein the top tread assembly is pivotable substantially within the mounting frame;

(c) a center tread assembly swingably coupled to the top tread assembly, the center tread assembly including first and second center brackets and a center step attached between the first and second center brackets;

(d) a bottom tread assembly pivotally attached to the center tread assembly and including first and second bottom brackets and a bottom step attached between the first and second bottom brackets; and (e) a set of stops to stop and center the top tread assembly as the top tread assembly is pivoted from within the mounting frame to an extended position, the stops including a mounting frame stop and a top assembly stop, the mounting frame stop being secured to at least one of the mounting brackets and the top assembly stop being secured to at least one of the top brackets; and wherein each stop has a portion forming an acute angle with the respective bracket, the angled portions of the stops being arranged and configured to engage each other as the top tread assembly is pivoted from within the mounting frame to stop the pivotal movement of the top tread assembly at a predefined position.

21. A retractable step apparatus comprising:

(a) a mounting frame including first and second spaced-apart mounting brackets;

(b) a top tread assembly pivotally attached to the mounting frame, the top tread assembly including first and second spaced-apart top brackets and a top step attached between the first and second top brackets, wherein the top tread assembly is pivotable substantially within the mounting frame; and (c) a set of stops to stop and center the top tread assembly as the top tread assembly is pivoted from within the mounting frame to an extended position, the stops including a mounting frame stop and a top assembly stop, the mounting frame stop being secured to at least one of the mounting brackets and the top assembly stop being secured to at least one of the top brackets; and wherein each stop has a portion forming an acute angle with the respective bracket, the angled portions of the stops being arranged and configured to engage each other as the top tread assembly is pivoted from within the mounting frame to stop the pivotal movement of the top tread assembly at a predefined position.

* * * * *

UNITED STATES PATENT AND TRADEMARK OFFICE
CERTIFICATE OF CORRECTION

PATENT NO. : 5,505,476
DATED : April 9, 1996
INVENTOR(S) : M. Maccabee

It is certified that error appears in the above-indentified patent and that said Letters Patent is hereby corrected as shown below:

| COLUMN | LINE | |
|---|---|---|
| [57] (pg. 1, col. 2) | Abstract line 2 | After "(6)" delete "," |
| [57] (pg. 1, col. 2) | Abstract line 23 | "comers" should read --corners-- |
| 1 | 36 | "abovedescribed" should read --above-described-- |
| 4 | 28 | "comers" should read --corners-- |
| 4 | 36 | "fight" should read --right-- |
| 4 | 45 | "fight" should read --right-- |
| 5 | 4 | "comers" should read --corners-- |
| 5 | 11 | "comers" should read --corners-- |
| 5 | 19 | "fight." should read --right.-- |
| 7 | 1 | "beating" should read --bearing-- |
| 9 (Claim 10, | 55 line 2) | "repenting" should read --mounting-- |
| 11 (Claim 19, | 67 line 5) | "comers;" should read --corners;-- |

UNITED STATES PATENT AND TRADEMARK OFFICE
CERTIFICATE OF CORRECTION

PATENT NO.   : 5,505,476
DATED        : April 9, 1996
INVENTOR(S)  : M. Maccabee It is certified that error appears in the above-indentified patent and that said Letters Patent is hereby corrected as shown below:

| COLUMN | LINE | |
|---|---|---|
| 12 (Claim 19, line 4) | 2 | "comers" should read --corners-- |

Signed and Sealed this

Sixth Day of August, 1996

Attest:

BRUCE LEHMAN

*Attesting Officer*    Commissioner of Patents and Trademarks